United States Patent [19]

Rybicki

[11] 4,379,623
[45] Apr. 12, 1983

[54] 40X MICROSCOPE OBJECTIVE

[75] Inventor: Edward B. Rybicki, Depew, N.Y.

[73] Assignee: Warner Lambert Technologies, Inc., Southbridge, Mass.

[21] Appl. No.: 144,478

[22] Filed: Apr. 28, 1980

[51] Int. Cl.³ .................... G02B 9/60; G02B 21/02
[52] U.S. Cl. .................................................... 350/414
[58] Field of Search ................................. 350/414, 465

[56] References Cited

U.S. PATENT DOCUMENTS

| | | | |
|---|---|---|---|
| 3,450,463 | 6/1969 | Yasuda | 350/414 X |
| 3,552,831 | 1/1971 | Shoemaker | 350/414 |
| 3,623,792 | 11/1971 | Uetaki | 350/414 |
| 3,879,111 | 4/1975 | Goto | 350/414 |

FOREIGN PATENT DOCUMENTS 601647  4/1978  U.S.S.R. ............................ 350/414

*Primary Examiner*—John K. Corbin
*Assistant Examiner*—Scott J. Sugarman
*Attorney, Agent, or Firm*—Alan H. Spencer

[57] ABSTRACT

A five-component 40x microscope objective having a plano-convex positive doublet as the third element providing sufficient color correction to permit classification as a semi-apochromatic objective is disclosed.

3 Claims, 1 Drawing Figure

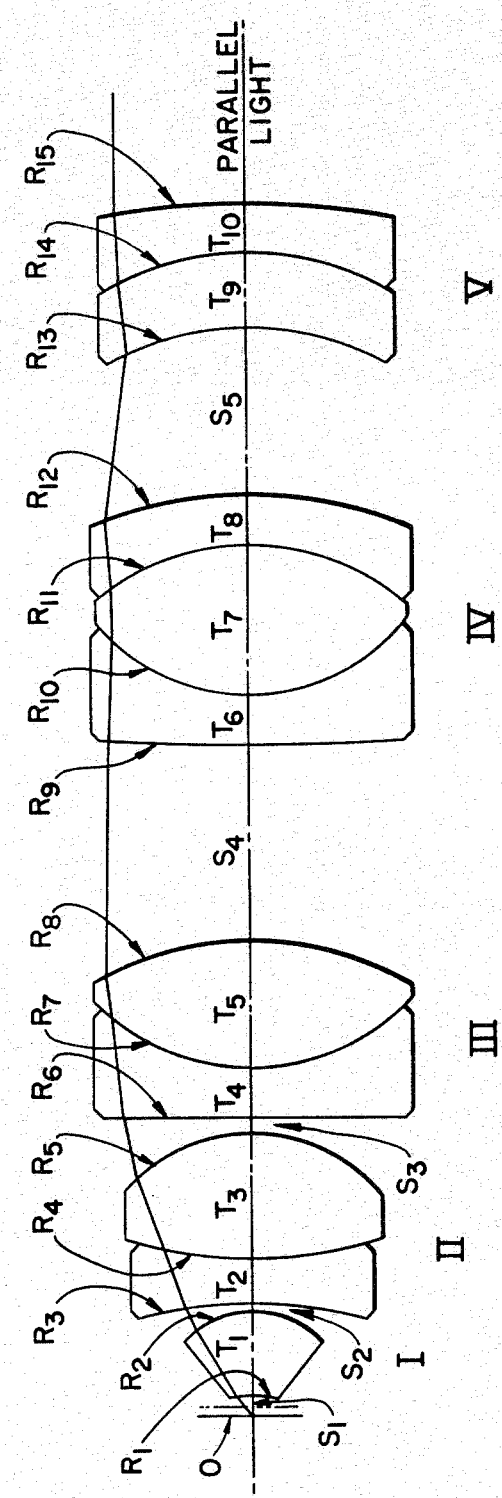

40X MICROSCOPE OBJECTIVE

BACKGROUND OF THE INVENTION

This invention relates to improvements in microscope objectives, and in particular to a semi-apochromatic microscope objective with a numerical aperture of substantially 0.80, and a magnification of substantially 40x when used with a telescope lens. It is the object of this invention to provide such a microscope objective in which the usual chromatic image aberrations are exceptionally well-corrected as well as spherical aberration, coma, and astigmatism, while having a substantially flat image over a 20 millimeter field when used with telescope as described in U.S. Pat. No. 3,355,234 and a typical 10x eyepiece.

Prior Art

U.S. Pat. No. 3,552,831 issued to Shoemaker, Jan. 5, 1971. This patent discloses a three member achromatic 40x objective having three members. The first member is a meniscus singlet and the second and third members are each bi-convex doublets.

U.S. Pat. No. 3,623,792 issued Nov. 30, 1971 to Uetake. The patent discloses a 40x objective having three doublets. The first doublet is meniscus shaped while the second and third doublets are bi-convex.

U.S. Pat. No. 3,879,111 issued Apr. 22, 1975 to Guto. This patent discloses a five member 40x objective having a meniscus first element, a meniscus second element, a bi-convex doublet as the third element, a meniscus doublet as the fourth element and a meniscus doublet as the fifth element. The first, second and fourth elements have the concave surface of the meniscus lens on the object side of the element with the fifth element having the concave surface on the side opposite the object side of the element.

THE DRAWING AND THE INVENTION

The drawing is an optical diagram of the preferred form of the present invention wherein the numeral X designates the objective in general, and the numerals I, II, III, IV, and V designate the five optically aligned lenses of said objective. The foremost lens I is a concavo-convex positive singlet. Rearward of lens I is lens II, a concavo-convex positive doublet, followed respectively by lens III, a plano-convex positive doublet, and lens IV, a bi-convex positive triplet. The rearmost lens V is a concavo-convex negative doublet.

THE DESCRIPTION

With respect to the lens parameters, the axial thicknesses of successive lens elements are designated $T_1$ to $T_{10}$ and the successive axial spaces from the object plane (designated O) are $S_1$ to $S_5$. The successive lens radii are designated $R_1$ to $R_{15}$ where the minus sign (−) applies to surfaces whose center of curvature lies on the object side of their vertices. The refractive indices and Abbe numbers of the glasses in the successive lenses are designated $ND(1)$ to $ND(10)$, and $V(1)$ to $V(10)$ respectively.

TABLE I

| Lens | Radius (R) | Thickness (T) | Space (S) | Refractive Index (ND) | Abbe Number ($\nu$) |
|---|---|---|---|---|---|
|  |  |  | $S_1 = 0.066\ f$ |  |  |
|  | $R_1 = -0.473\ f$ |  |  |  |  |
| I |  | $T_1 = 0.504\ f$ |  | $1.78 < ND_1 < 1.79$ | $49.7 < \nu_1 < 50.7$ |
|  | $R_2 = -0.552\ f$ |  |  |  |  |
|  |  |  | $S_2 = 0.040\ f$ |  |  |
|  | $R_3 = -2.755\ f$ |  |  |  |  |
| II | $R_4 = 2.835\ f$ | $T_2 = 0.263\ f$ |  | $1.52 < ND_2 < 1.53$ | $51 < \nu_2 < 52$ |
|  | $R_5 = -1.052\ f$ | $T_3 = 0.723\ f$ |  | $1.48 < ND_3 < 1.49$ | $84 < \nu_3 < 85$ |
|  |  |  | $S_3 = 0.125\ f$ |  |  |
|  | $R_6 = \infty$ |  |  |  |  |
| III | $R_7 = 1.433\ f$ | $T_4 = 0.285\ f$ |  | $1.51 < ND_4 < 1.52$ | $63.5 < \nu_4 < 64.5$ |
|  | $R_8 = -1.976\ f$ | $T_5 = 0.745\ f$ |  | $1.48 < ND_5 < 1.49$ | $84 < \nu_5 < 85$ |
|  |  |  | $S_4 = 1.293\ f$ |  |  |
|  | $R_9 = 12.362\ f$ |  |  |  |  |
|  | $R_{10} = 1.228\ f$ | $T_6 = 0.285\ f$ |  | $1.51 < ND_6 < 1.52$ | $63.5 < \nu_6 < 64.5$ |
| IV | $R_{11} = -1.470\ f$ | $T_7 = 0.877\ f$ |  | $1.48 < ND_7 < 1.49$ | $84 < \nu_7 < 85$ |
|  | $R_{12} = -2.389\ f$ | $T_8 = 0.285\ f$ |  | $1.69 < ND_8 < 1.705$ | $29.5 < \nu_8 < 30.5$ |
|  |  |  | $S_5 = 0.855\ f$ |  |  |
|  | $R_{13} = -1.838\ f$ |  |  |  |  |
| V | $R_{14} = -1.666\ f$ | $T_9 = 0.438\ f$ |  | $1.78 < ND_9 < 1.79$ | $25.5 < \nu_9 < 26.5$ |
|  | $R_{15} = -8.219\ f$ | $T_{10} = 0.285\ f$ |  | $1.52 < ND_{10} < 1.53$ | $51 < \nu_{10} < 52$ | wherein the indices of refraction and Abbe numbers are absolute values and f is the focal length in millimeters of objective x and is about 3 to 6 mm.

Numerically stated, the constructional data for one successful form of the invention where f is 4.563 mm is given in the following table.

TABLE II

| Lens | Radius (R) | Thickness (T) | Space (S) | Refractive Index (ND) | Abbe Number ($\nu$) |
|---|---|---|---|---|---|
| | | | $S_1 = 0.299$ | | |
| I | $R_1 = -2.157$ | $T_1 = 2.3$ | | $ND_1 = 1.786$ | $\nu_1 = 50.22$ |
| | $R_2 = -2.518$ | | | | |
| | | | $S_2 = 0.182$ | | |
| | $R_3 = -12.57$ | | | | |
| II | $R_4 = 12.936$ | $T_2 = 1.2$ | | $ND_2 = 1.523$ | $\nu_2 = 51.48$ |
| | $R_5 = -4.8$ | $T_3 = 3.3$ | | $ND_3 = 1.487$ | $\nu_3 = 84.46$ |
| | $R_6 = \infty$ | | $S_3 = 0.57$ | | |
| III | $R_7 = 6.538$ | $T_4 = 1.3$ | | $ND_4 = 1.517$ | $\nu_4 = 64.16$ |
| | $R_8 = -9.015$ | $T_5 = 3.4$ | | $ND_5 = 1.487$ | $\nu_5 = 84.46$ |
| | $R_9 = 56.403$ | | $S_4 = 5.9$ | | |
| | $R_{10} = 5.603$ | $T_6 = 1.3$ | | $ND_6 = 1.517$ | $\nu_6 = 64.16$ |
| IV | $R_{11} = -6.707$ | $T_7 = 4.0$ | | $ND_7 = 1.487$ | $\nu_7 = 84.46$ |
| | $R_{12} = -10.9$ | $T_8 = 1.3$ | | $ND_8 = 1.699$ | $\nu_8 = 30.06$ |
| | $R_{13} = -8.388$ | | $S_5 = 3.9$ | | |
| V | $R_{14} = -7.599$ | $T_9 = 2.0$ | | $ND_9 = 1.785$ | $\nu_9 = 25.75$ |
| | $R_{15} = -37.5$ | $T_{10} = 1.3$ | | $ND_{10} = 1.523$ | $\nu_{10} = 51.48$ |

I claim:

1. A semi-apochromatic microscope objective having a numerical aperture of 0.80 which comprises, aligned in sequence along an optical axis, a concavo-convex positive singlet I, a concavo-convex positive doublet II, a plano-convex positive doublet III, a biconvex positive triplet IV and a concavo-convex negative doublet V, said biconvex positive triplet IV comprising a convex-concavo first element, a biconvex second element, and a concavo-convex third element.

2. The microscope objective according to claim 1 wherein the parameters of components I, II, III, IV and V are as follows:

| Lens | Radius (R) | Thickness (T) | Space (S) | Refractive Index (ND) | Abbe Number ($\nu$) |
|---|---|---|---|---|---|
| | | | $S_1 = 0.066\ f$ | | |
| I | $R_1 = -0.473\ f$ | $T_1 = 0.504\ f$ | | $1.78 < ND_1 < 1.79$ | $49.7 < \nu_1 < 50.7$ |
| | $R_2 = -0.552\ f$ | | | | |
| | | | $S_2 = 0.040\ f$ | | |
| | $R_3 = -2.755\ f$ | $T_2 = 0.263\ f$ | | $1.52 < ND_2 < 1.53$ | $51 < \nu_2 < 52$ |
| II | $R_4 = 2.835\ f$ | $T_3 = 0.723\ f$ | | $1.48 < ND_3 < 1.49$ | $84 < \nu_3 < 85$ |
| | $R_5 = -1.052\ f$ | | | | |
| | $R_6 = \infty$ | | $S_3 = 0.125\ f$ | | |
| III | $R_7 = 1.433\ f$ | $T_4 = 0.285\ f$ | | $1.51 < ND_4 < 1.52$ | $63.5 < \nu_4 < 64.5$ |
| | $R_8 = -1.976\ f$ | $T_5 = 0.745\ f$ | | $1.48 < ND_5 < 1.49$ | $84 < \nu_5 < 85$ |
| | $R_9 = 12.362\ f$ | | $S_4 = 1.293\ f$ | | |
| | $R_{10} = 1.228\ f$ | $T_6 = 0.285\ f$ | | $1.51 < ND_6 < 1.52$ | $63.5 < \nu_6 < 64.5$ |
| IV | $R_{11} = -1.470\ f$ | $T_7 = 0.877\ f$ | | $1.48 < ND_7 < 1.49$ | $84 < \nu_7 < 85$ |
| | $R_{12} = -2.389\ f$ | $T_8 = 0.285\ f$ | | $1.69 < ND_8 < 1.705$ | $29.5 < \nu_8 < 30.5$ |
| | $R_{13} = -1.838\ f$ | | $S_5 = 0.855\ f$ | | |
| V | $R_{14} = -1.666\ f$ | $T_9 = 0.438\ f$ | | $1.78 < ND_9 < 1.79$ | $25.5 < \nu_9 < 26.5$ |
| | $R_{15} = -8.219\ f$ | $T_{10} = 0.285\ f$ | | $1.52 < ND_{10} < 1.53$ | $51 < \nu_{10} < 52$ | wherein f is 3 mm to 6 mm.

3. The microscope objective of claim 2 wherein f is 4.563, $ND_1$ is 1.786, $ND_2$ and $ND_{10}$ are 1.523, $ND_3$, $ND_5$ and $ND_7$ are 1.487, $ND_4$ and $ND_6$ are 1.517, $ND_8$ is 1.699, $ND_9$ is 1.785, $\nu_1$ is 50.22, $\nu_2$ and $\nu_{10}$ are 51.48, $\nu_3$, $\nu_5$ and $\nu_7$ are 84.46, $\nu_4$ and $\nu_6$ are 64.16, $\nu_8$ is 30.06 and $\nu_9$ is 25.75.

* * * * *